US011198809B2

(12) United States Patent
Cadix et al.

(10) Patent No.: US 11,198,809 B2
(45) Date of Patent: Dec. 14, 2021

(54) AMPHIPHILIC POLYMERS FOR FILTRATE CONTROL

(71) Applicant: RHODIA OPERATIONS, Paris (FR)

(72) Inventors: Arnaud Cadix, Saint-Ouen (FR); David James Wilson, Coye la Forêt (FR)

(73) Assignee: RHODIA OPERATIONS, Aubervilliers (FR)

(*) Notice: Subject to any disclaimer, the term of this patent is extended or adjusted under 35 U.S.C. 154(b) by 0 days.

(21) Appl. No.: 15/578,928

(22) PCT Filed: Jun. 2, 2016

(86) PCT No.: PCT/EP2016/062439
§ 371 (c)(1),
(2) Date: Dec. 1, 2017

(87) PCT Pub. No.: WO2016/193334
PCT Pub. Date: Dec. 8, 2016

(65) Prior Publication Data
US 2018/0171206 A1 Jun. 21, 2018

(30) Foreign Application Priority Data
Jun. 3, 2015 (FR) .................................. 1501147

(51) Int. Cl.
C09K 8/487 (2006.01)
C04B 24/16 (2006.01)
C04B 28/04 (2006.01)
C09K 8/035 (2006.01)
C09K 8/467 (2006.01)
C09K 8/88 (2006.01)
C08F 293/00 (2006.01)
C09K 8/68 (2006.01)
C08F 2/38 (2006.01)
C09K 8/40 (2006.01)
C04B 103/00 (2006.01)
(Continued)

(52) U.S. Cl.
CPC ............ C09K 8/487 (2013.01); C04B 24/163 (2013.01); C04B 28/04 (2013.01); C08F 2/38 (2013.01); C08F 293/00 (2013.01); C08F 293/005 (2013.01); C09K 8/035 (2013.01); C09K 8/40 (2013.01); C09K 8/467 (2013.01); C09K 8/68 (2013.01); C09K 8/88 (2013.01); C04B 2103/0061 (2013.01); C04B 2103/408 (2013.01); C04B 2103/46 (2013.01)

(58) Field of Classification Search
CPC . C09K 8/68; C09K 8/035; C09K 8/12; C09K 8/88; C09K 8/508; C09K 8/882; C09K 8/685; C09K 8/588; C09K 8/887; C09K 2208/10; C09K 2208/26; C09K 8/487; C09K 2208/18; C09K 2208/30; C09K 8/24; C09K 8/467; C09K 8/62; C09K 8/725; C09K 8/74; C09K 8/76; C09K 8/70; C09K 2208/08; C09K 8/40; C09K 8/5751; C09K 17/40; C09K 8/03; C09K 8/502; C09K 8/52; C09K 8/72; C09K 2208/28; C09K 8/28; C09K 8/36; C09K 8/506; C09K 8/602; C09K 8/92; C09K 8/08; C09K 8/48; C09K 8/5083; C09K 8/516; C09K 8/58; C09K 8/64; C09K 8/86; C09K 17/48; C09K 2208/12; C09K 2208/32; C09K 8/10; C09K 8/26; C09K 8/42; C09K 8/5045; C09K 8/56; C09K 8/582; C09K 8/665; C09K 8/80; C09K 8/805; C09K 8/82; E21B 43/26; E21B 33/138; E21B 33/13; E21B 7/00; E21B 43/267; E21B 43/04; E21B 43/16; E21B 21/003; E21B 23/06; E21B 33/12; E21B 33/1208; E21B 43/20; E21B 21/00; E21B 33/14; E21B 37/00; E21B 43/006; E21B 43/25
See application file for complete search history.

(56) References Cited

U.S. PATENT DOCUMENTS 6,395,853 B1 * 5/2002 Oswald ............... C04B 24/163
526/307.2
9,580,535 B2 2/2017 Wilson et al.
(Continued)

FOREIGN PATENT DOCUMENTS

CN 103261097 A 8/2013
CN 103525379 * 1/2014
(Continued)

OTHER PUBLICATIONS

Plank et al., Effect of different anchor groups on adsorption behavior and effectiveness of poly(N,N-1 dimethylacrylamide-co-Ca 2-acrylamido-2-methylpropanesulfonate) as cement fluid loss additive in presence of acetone-formaldehyde-sulfite dispersant, J. Appl. Polym. Sci., vol. 106, No. 6, 2007.*
(Continued)

Primary Examiner — Kumar R Bhushan
(74) Attorney, Agent, or Firm — Osha Bergman Watanabe & Burton LLP

(57) ABSTRACT

The present invention relates to the use of amphiphilic sequenced copolymers as an agent for controlling the filtrate in a fluid (F) injected under pressure into an underground formation, comprising—at least one chain (C) soluble in the fluid (F); and—at least one block (B) that is insoluble in the fluid (F).

12 Claims, No Drawings

(51) Int. Cl.
*C04B 103/40* (2006.01)
*C04B 103/46* (2006.01)

(56) References Cited

U.S. PATENT DOCUMENTS

| | | | | |
|---|---|---|---|---|
| 2014/0378617 A1* | 12/2014 | Wilson | ............... | C08F 2/38 |
| | | | | 525/291 |
| 2016/0214896 A1 | 7/2016 | Cadix et al. | | |
| 2016/0298023 A1 | 10/2016 | Cadix et al. | | |
| 2017/0022408 A1* | 1/2017 | Zha | ............... | C09K 8/508 |

FOREIGN PATENT DOCUMENTS

| | | | |
|---|---|---|---|
| CN | 104193897 A | | 12/2014 |
| CN | 104662122 A | | 5/2015 |
| WO | WO2013/060741 | * | 5/2013 |
| WO | 2014167056 A1 | | 10/2014 |
| WO | WO2015/049378 | * | 4/2015 |

OTHER PUBLICATIONS

Johann Plank et al: "Effect of different anchor groups on adsorption behavior and effectiveness of poly(N,N-dimethylacrylamide-co-Ca 2-acrylamido-2-methylpropanesulfonate) as cement fluid loss additive in presence of acetone-formaldehyde-sulfite dispersant", J. Appl. Polym. Sci., vol. 106, No. 6, http://onlinelibrary.wiley.com/doi/10.1002/app.26897/abstract.

Frank W. Harris "Introduction to polymer chemistry" J. Chem. Educ. (1981) vol. 58, No. 11, pp. 837-843.

Office Action issued in corresponding European Application No. 16727171.7; dated Apr. 9, 2021 (6 pages).

Office Action issued in corresponding Chinese Application No. 201680032290.5, dated Aug. 2, 2021 (7 pages).

* cited by examiner

AMPHIPHILIC POLYMERS FOR FILTRATE CONTROL

This application is a U.S. national phase entry under 35 U.S.C. § 371 of International Application No. PCT/EP2016/062439, filed on Jun. 2, 2016, which claims priority to French Application No. 1501147, filed on Jun. 3, 2015. The entire contents of these applications are being incorporated herein by this reference.

The present invention relates to the field of oil extraction. More specifically, it relates to agents providing an effect of control of fluid loss in fluids injected under pressure into subterranean formations.

In the field of oil extraction, numerous stages are carried out by injecting fluids under pressure within subterranean formations. In the present description, the notion of "subterranean formation" is understood in its broadest sense and includes both a rock containing hydrocarbons, in particular oil, and the various rock layers traversed in order to access this oil-bearing rock and to ensure the extraction of the hydrocarbons. Within the meaning of the present description, the notion of "rock" is used to denote any type of constituent material of a solid subterranean formation, whether or not the material constituting it is strictly speaking a rock. Thus, in particular, the expression "oil-bearing rock" is employed here as synonym for "oil-bearing reservoir" and denotes any subterranean formation containing hydrocarbons, in particular oil, whatever the nature of the material containing these hydrocarbons (rock or sand, for example).

Mention may in particular be made, among the fluids injected under pressure into subterranean formations, of the various fluids for completion and workover of the wells, in particular drilling fluids, whether they are used to access the oil-bearing rock or else to drill the reservoir itself ("drill-in"), or else fracturing fluids, or alternatively completion fluids, control or workover fluids or annular fluids or packer fluids.

A specific case is that of oil cement grouts, which are employed for the cementing of the annulus of oil wells according to a method well-known per se, for example described in *Le Forage* [Drilling] by J. P Nguyen (Editions Technip 1993). These oil cement grouts are injected under pressure within a metal casing introduced into the drilling hole of the oil wells, then rise again, under the effect of the pressure, via the "annulus" space located between the casing and the drilling hole, and then set and harden in this annulus, thus ensuring the stability of the well during drilling.

Within an oil extraction well, bringing the pressurized fluid into contact with the subterranean formation (which generally exhibits a more or less high porosity, or even cracks) results in an effect of "fluid loss": the liquid present in the fluid has a tendency to penetrate into the constituent rock of the subterranean formation, which can damage the well, indeed even harm its integrity. When these fluids employed under pressure contain insoluble compounds (which is very often the case, in particular for oil cement grouts or else drilling or fracturing fluids), the effect of fluid loss at the same time brings about risks of loss of control of the fluids injected an increase in the concentration of insoluble compounds of the fluid, which can result in an increase in viscosity, which affects the mobility of the fluid.

In the specific case of a cement grout, the fluid loss can in addition result in aggregation or gelling of the grout, before the space of the annulus is filled with the grout, which can, inter alia, weaken the structure of the well and harm its leaktightness.

For further details relating to the effect of fluid loss and its cementing effects, reference may in particular be made to *Well Cementing*, E. B. Nelson (Elsevier, 1990).

For the purpose of inhibiting the phenomenon of fluid loss, a number of additives have been described which make it possible to limit (indeed even in some cases completely prevent) the escape of the liquid present in the fluid toward the rock with which it comes into contact. These additives, known as "fluid loss control agents", generally make it possible to obtain, in parallel, an effect of control of the migration of gases, namely isolation of the fluid with respect to the gases present in the rock (gases which it is advisable to prevent from penetrating into the fluid, in particular in the case of cement grouts, these gases having a tendency to weaken the cement during setting).

Various fluid loss control agents of the abovementioned type have been provided, which include in particular cellulose derivatives (for example hydroxyethylcellulose) or alternatively hydrophilic AMPS-based copolymers, such as those described, for example, in U.S. Pat. Nos. 4,632,186 or 4,515,635. These additives are not always fully suitable for providing, in practice, effective limitation of fluid loss. In particular, and this is especially the case in the field of oil cement grouts, the presence of other additives can inhibit the effect of the agents employed for providing control of fluid loss. In particular, in the presence of some dispersing agents or set retarders, the abovementioned fluid loss control agents generally experience a deterioration in their properties.

There is described, in WO 2015/049378, the use of a hydrophilic diblock polymer as fluid loss control agent, namely a short block (A) bonded to a long block (B). The short block provides the effect of anchoring with the cement particles and the block B provides the effect of local increase in the viscosity of the fluid around the particles.

One aim of the present invention is to provide novel fluid loss control agents for fluids injected under pressure into subterranean formations.

To this end, the present invention provides for the use, as agent for controlling fluid loss in a fluid (F) injected under pressure into a subterranean formation, of sequential copolymers (P) comprising
- at least one chain (C) soluble in the fluid (F), typically water-soluble; and
- at least one block (B) insoluble in the fluid (F), typically hydrophobic.

The polymer used according to the invention is an amphiphilic copolymer, in the sense that it comprises:
- the chain (C) which is a chain soluble in the fluid (F), typically having a solubility at 20° C. of greater than or equal to 0.5% (5 000 ppm), preferably of greater than or equal to 1%, in the fluid (F),
- the block (B) which is a polymer sequence insoluble in the fluid (F), typically having a solubility at 20° C. of less than or equal to 0.1% (1000 ppm) in the fluid (F).

The block (B) can be:
external to the chain (C):
use may typically be made of diblock, triblock or multi-block polymers where at least one of the blocks consists of the chain (C) and at least one of the other blocks is the block (B); or
incorporated in the chain (C):
in this case, the chain (C) is soluble overall but contains at least one insoluble sequence. Preferably, the insoluble sequence or sequences represent between 0.05 and 5% of the total weight of the chain (C).

The control of the fluid loss carried out according to the invention is obtained in the context of an oil extraction and it makes it possible to limit, indeed even completely inhibit, the escape of the fluid (F), typically water or an aqueous composition, into the subterranean formation where the extraction is being carried out. This control of the fluid loss can in particular be obtained when the polymers of the invention are employed with particles but control of the fluid loss can also be obtained in the absence of particles. When the polymers are employed with particles, they can be particles present within the subterranean formation and/or particles injected within the subterranean formation, typically in conjunction with the copolymers (such as, for example, cement particles in the case of a fluid employed in cementing).

According to a specific embodiment, the chain (C) is of the type obtained by micellar polymerization. In this case, the chain (C) is soluble overall and typically comprises a chain predominantly formed of hydrophilic units interrupted at different points by a plurality of hydrophobic sequences (B) of substantially identical size. According to this embodiment, the polymer of the invention can consist of the chain (C) or else be a block copolymer where the chain (C) constitutes one of the blocks.

Micellar polymerization consists schematically in carrying out a polymerization of hydrophilic monomers in a hydrophilic medium comprising micelles including hydrophobic monomers. Examples of micellar polymerization have in particular been described in U.S. Pat. No. 4,432,881 or else in *Polymer*, Vol. 36, No. 16, pp. 3197-3211 (1996), to which documents reference may be made for further details.

Use may typically be made, according to the invention, of a micellar polymerization, where the following are copolymerized (typically via the radical route) within an aqueous dispersing medium (typically water or a water/alcohol mixture):

hydrophilic monomers in the dissolved or dispersed state in said medium; and hydrophobic monomers within surfactant micelles formed in said medium by introducing this surfactant therein at a concentration above its critical micelle concentration (cmc).

Preferably, the content of hydrophobic monomers corresponding to the ratio of the weight of the hydrophobic monomers with respect to the total weight of the hydrophobic and hydrophilic monomers is greater than or equal to 0.05%, preferably greater than 0.1%, indeed even greater than 0.2%, and less than or equal to 5%. Generally, the percentage of the hydrophobic units in the chain (C) is of the same order, typically greater than or equal to 0.05%, preferably greater than 0.1%, indeed even greater than 0.2%, and less than or equal to 5%.

According to a specific embodiment, the hydrophobic monomers present within surfactant micelles employed in micellar polymerization can be monomers which, in themselves, have the property of forming micelles without needing to add additional surfactants (monomers referred to as "self-micellizable"). According to this specific embodiment, the surfactant employed can be the self-micellizable hydrophobic monomer itself, employed without other surfactant, although the presence of such an additional surfactant is not excluded. Thus, within the meaning of the present description, when mention is made of hydrophobic monomers within surfactant micelles, this notion encompasses both (i) hydrophobic monomers present within surfactant micelles other than these monomers and (ii) monomers comprising at least one hydrophobic part or block and forming by themselves the micelles in aqueous medium. The two abovementioned embodiments (i) and (ii) are compatible and can coexist (hydrophobic monomers within micelles formed by another self-micellizable monomer for example, or else micelles comprising a combination of surfactants and self-micellizable monomers).

In micellar polymerization, the hydrophobic monomers present in the micelles are said to be in "micellar solution". The micellar solution to which reference is made is a micro-heterogeneous system which is generally isotropic, optically transparent and thermodynamically stable.

It should be noted that a micellar solution of the type employed in micellar polymerization should be distinguished from a microemulsion. In particular, in contrast to a microemulsion, a micellar solution is formed at any concentration exceeding the critical micelle concentration of the surfactant employed, with the sole condition that the hydrophobic monomer be soluble at least to a certain extent within the internal space of the micelles. A micellar solution furthermore differs from an emulsion in the absence of homogeneous internal phase: the micelles contain a very small number of molecules (typically less than 1000, generally less than 500 and typically from 1 to 100, with most often 1 to 50, monomers, and at most a few hundred surfactant molecules, when a surfactant is present) and the micellar solution generally has physical properties similar to those of the monomer-free surfactant micelles. Moreover, generally, a micellar solution is transparent with respect to visible light, given the small size of the micelles, which does not result in refraction phenomena, unlike the drops of an emulsion, which refract light and give it its characteristic cloudy or white appearance.

The micellar polymerization technique results in characteristic sequential polymers which each comprise several hydrophobic blocks of substantially the same size and where this size can be controlled. Specifically, given the confinement of the hydrophobic monomers within the micelles, each of the hydrophobic blocks comprises substantially one and the same defined number $n_H$ of hydrophobic monomers, it being possible for this number $n_H$ to be calculated as follows (Macromolecular Chem. Physics, 202, 8, 1384-1397, 2001):

$$n_H = N_{agg} \cdot [M_H]/([\text{surfactant}] - cmc)$$

where:

$N_{agg}$ is the aggregation number of the surfactant, which reflects the surfactant number present in each micelle $[M_H]$ is the molar concentration of hydrophobic monomer in the medium

[surfactant] is the molar concentration of surfactant in the medium and cmc is the critical micelle (molar) concentration.

The micellar polymerization technique thus makes possible advantageous control of the hydrophobic units introduced into the polymers formed, namely:

overall control of the molar fraction of hydrophobic units in the polymer (by adjusting the ratio of the concentrations of the two monomers); and more specific control of the number of hydrophobic units present in each of the hydrophobic blocks (by modifying the parameters influencing the $n_H$ defined above).

The chain (C) overall soluble in the fluid (F), which is obtained by micellar polymerization, comprises:

a hydrophilic component, composed of the hydrophilic monomers, which corresponds to a hydrophilic polymer chain which would have a solubility typically of greater than or equal to 1% (10 000 ppm) at 20° C. if it were introduced alone into the fluid (F), a hydrophobic component, composed of the hydrophobic sequences, each having a solubility typically of less than or equal to 0.1% (1 000 ppm) at 20° C. in the fluid (F).

In many cases, the chain (C) can be described as a hydrophilic chain having the abovementioned solubility (at least 1%) to which pendant hydrophobic groups are grafted. In particular in this case, the chain (C) has overall a solubility at 20° C. in the fluid (F) which preferably remains greater than or equal to 0.1%, indeed even 0.5%.

According to a specific embodiment, the chain (C) is of the type obtained by a process comprising a stage (e) of micellar radical polymerization in which the following are brought into contact, within an aqueous medium (M):
- hydrophilic monomers, dissolved or dispersed in said aqueous medium (M) (typically water or a water/alcohol mixture);
- hydrophobic monomers in the form of a micellar solution, namely a solution containing, in the dispersed state within the medium (M), micelles comprising these hydrophobic monomers (it being possible in particular for this dispersed state to be obtained using at least one surfactant); and
- at least one radical polymerization initiator, this initiator typically being water-soluble or water-dispersible.

According to a preferred embodiment, the chain (C) is of the type obtained by a process comprising a stage (E) of micellar radical polymerization in which the following are brought into contact, within an aqueous medium (M):
- hydrophilic monomers, dissolved or dispersed in said aqueous medium (M) (typically water or a water/alcohol mixture);
- hydrophobic monomers in the form of a micellar solution, namely a solution containing, in the dispersed state within the medium (M), micelles comprising these hydrophobic monomers (it being possible in particular for this dispersed state to be obtained using at least one surfactant);
- at least one radical polymerization initiator, this initiator typically being water-soluble or water-dispersible; and
- at least one radical polymerization control agent.

Stage (E) is similar to the abovementioned stage (e) but employs an additional control agent. This stage, known under the name of "controlled-nature micellar radical polymerization", has in particular been described in WO 2013/060741. All the alternative forms described in this document can be used here.

Within the meaning of the present description, the term "radical polymerization control agent" is understood to mean a compound which is capable of extending the lifetime of the growing polymer chains in a polymerization reaction and of conferring, on the polymerization, a living or controlled nature. This control agent is typically a reversible transfer agent as employed in controlled radical polymerizations denoted under the terminology RAFT or MADIX, which typically employ a reversible addition-fragmentation transfer process, such as those described, for example, in WO 96/30421, WO 98/01478, WO 99/35178, WO 98/58974, WO 00/75207, WO 01/42312, WO 99/35177, WO 99/31144, FR 2 794 464 or WO 02/26836.

According to an advantageous embodiment, the radical polymerization control agent employed in stage (E) is a compound which comprises a thiocarbonylthio —S(C=S)— group. Thus, for example, it can be a compound which comprises a xanthate group (carrying —SC=S—O— functional groups), for example a xanthate. Other types of control agent can be envisaged (for example of the type of those employed in CRP or in ATRP).

According to a specific embodiment, the control agent employed in stage (E) can be a polymer chain resulting from a controlled radical polymerization and carrying a group which is capable of controlling a radical polymerization (polymer chain of "living" type, which is a type well known per se). Thus, for example, the control agent can be a polymer chain (preferably hydrophilic or water-dispersible) functionalized at the chain end with a xanthate group or more generally comprising an —SC=S— group, for example obtained according to the MADIX technology.

Alternatively, the control agent employed in stage (E) is a non-polymeric compound carrying a group which ensures the control of the radical polymerization, in particular a thiocarbonylthio —S(C=S)— group.

According to a specific alternative form, the radical polymerization control agent employed in stage (E) is a polymer, advantageously an oligomer, having a water-soluble or water-dispersible nature and carrying a thiocarbonylthio —S(C=S)— group, for example a xanthate —SC=S—O— group. This polymer, which is capable of acting both as control agent for the polymerization and as monomer in stage (E), is also denoted by "prepolymer" in the continuation of the description. Typically, this prepolymer is obtained by radical polymerization of hydrophilic monomers in the presence of a control agent carrying a thiocarbonylthio —S(C=S)— group, for example a xanthate. Thus, for example, according to an advantageous embodiment which is illustrated at the end of the present description, the control agent employed in stage (E) can advantageously be a prepolymer carrying a thiocarbonylthio —S(C=S)— group, for example a xanthate —SC=S—O— group, obtained on conclusion of a stage ($E^0$) of controlled radical polymerization prior to stage (E). In this stage ($E^0$), hydrophilic monomers, advantageously identical to those employed in stage (E); a radical polymerization initiator and a control agent carrying a thiocarbonylthio —S(C=S)— group, for example a xanthate, can typically be brought into contact.

The use of the abovementioned stage ($E^0$) prior to stage (E) makes it possible, schematically, to hydrophilize a large number of control agents carrying thiocarbonylthio functional groups (for example xanthates, which are rather hydrophobic by nature), by converting them from prepolymers which are soluble or dispersible in the medium (M) of stage (E). Preferably, a prepolymer synthesized in stage ($E^0$) has a short polymer chain, for example comprising a series of less than 50 monomer units, indeed even less than 25 monomer units, for example between 2 and 15 monomer units.

When stage (E) is employed, the polymers according to the invention comprise chains (C) which have a "controlled" structure, namely that all the chains (C) present on the polymers have substantially the same size and the same structure. The chains (C) comprise in particular the blocks (B) substantially in the same number and proportion.

The specific polymer (P) employed in the context of the present invention, due to the presence of the hydrophobic sequences in a hydrophilic polymer chain, turns out to provide a control effect on the fluid which is particularly effective: without wishing to be committed to a theory, it appears that the hydrophobic units within a hydrophilic chain and/or different hydrophilic chains have a tendency to associate with one another. In a way, a "plug" effect is thus obtained at the porosities of the rock, which makes it possible to limit, indeed even to completely block, the phenomenon of filtration.

In addition, it has been demonstrated that this effect of controlling the filtrate was provided when the hydrophobic interactions between polymers and between the polymer and the particles (p) are sufficiently strong and numerous, in the case where the polymers are employed with the particles, or when the hydrophobic interactions between polymers are sufficiently strong and numerous, in the case where the polymers are employed without the particles.

For this, according to one embodiment of the invention, the number $n_H$ is equal to or greater than 3, preferably greater than 4, for example greater than 6.

The number $n_H$ is generally less than 30.

According to a preferred embodiment, the number $n_H$ is between 6 and 20 (limits included).

According to a first alternative form of the invention, the injected fluid (F) comprises the polymer (P) but does not comprise solid particles (p), and it encounters said particles (p) within the subterranean formation subsequent to its injection. The association between particles and polymers then takes place in situ. Such a fluid can, for example, be injected during a drilling operation, and the rock cuttings formed during the drilling then perform the role of the particles (p) in situ.

According to an alternative variant, the injected fluid (F) comprises, before the injection, at least a portion and generally all of the particles (p) associated with the polymer (P), it being understood that it can optionally encounter other particles (p) within the subterranean formation.

Two forms can in particular be envisaged in this context:
form 1: the polymer (P) and the particles (p) are mixed during the formulation of the fluid (F), on the site of operation or upstream, typically by adding the particles (p), in the dry state or optionally in the dispersed state, to a composition comprising the polymer (P) in solution. According to this alternative form, the fluid (F) can, for example, be an oil cement grout, which is prepared by adding cement powder as particles (p) to an aqueous composition comprising the polymer (P) in solution.
form 2: the fluid (F) is manufactured, advantageously on the site of operation, from a composition (premix) prepared upstream (hereinafter denoted by the term "blend") comprising the polymer (P) and at least a portion of the particles (p), generally within a dispersing liquid. In order to form the fluid (F), this blend is mixed with the other constituents of the fluid (F).

In the context of these forms 1 and 2, the polymer (P) incidentally exhibits the not insignificant advantage of improving the dispersibility and suspending of the particles (p). In some embodiments, the polymers (P) associated with the particles (p) can be employed mainly as dispersing and stabilizing agent for the dispersion of the particles (p), at the same time providing an effect of agent for control of fluid loss.

Various specific advantages and embodiments of the invention will now be described in more detail.

The Fluid (F)

The term "fluid" is understood to mean, within the meaning of the description, any homogeneous or non-homogeneous medium comprising a liquid or viscous vector which optionally transports a liquid or gelled dispersed phase and/or solid particles, said medium being overall pumpable by means of the devices for injection under pressure used in the application under consideration.

The term "liquid or viscous vector" of the fluid (F) is understood to mean the fluid itself, or else the solvent, in the case where the fluid comprises dissolved compounds, and/or the continuous phase, in the case where the fluid comprises dispersed elements (droplets of liquid or gelled dispersed phase, solid particles, and the like).

According to a highly suitable embodiment, the fluid (F) is an aqueous fluid. The term "aqueous" is understood here to mean that the fluid comprises water as liquid or viscous vector, either as sole constituent of the liquid or viscous vector or in combination with other water-soluble solvents.

In the case of the presence of solvents other than water in the liquid or viscous vector of the fluid (F), the water advantageously remains the predominant solvent within the liquid or viscous vector, advantageously present in a proportion of at least 50% by weight, indeed even of at least 75% by weight, with respect to the total weight of the solvents in the liquid or viscous vector.

The Particles (p)

The notion of "particle" within the meaning under which it is employed in the present description is not confined to that of individual particles. It more generally denotes solid entities which can be dispersed within a fluid, in the form of objects (individual particles, aggregates, and the like) for which all the dimensions are less than 5 mm, preferably less than 2 mm, for example less than 1 mm.

The particles (p) according to the invention can be chosen from: calcium carbonate or cement, silica or sand, clay, carbon black and/or their mixtures.

According to a specific embodiment of the invention, the particles (p) are calcium carbonate or cement particles.

The Polymers (P)

The Hydrophilic Monomers

The chain (C) can typically comprise monomers chosen from:
carboxylic acids which are ethylenically unsaturated, sulfonic acids and phosphonic acids, and/or its derivatives, such as acrylic acid (AA), methacrylic acid, ethacrylic acid, α-chloroacrylic acid, crotonic acid, maleic acid, maleic anhydride, itaconic acid, citraconic acid, mesaconic acid, glutaconic acid, aconitic acid, fumaric acid, monoethylenically unsaturated dicarboxylic acid monoesters comprising from 1 to 3 and preferably from 1 to 2 carbon atoms, for example monomethyl maleate, vinylsulfonic acid, (meth)allylsulfonic acid, sulfoethyl acrylate, sulfoethyl methacrylate, sulfopropyl acrylate, sulfopropyl methacrylate, 1-allyloxy-2-hydroylpropyl sulfonate, 2-hydroxy-3-acryloyloxypropylsulfonic acid, 2-hydroxy-3-methacryloyloxypropylsulfonic acid, styrenesulfonic acids, 2-acrylamido-2-methylpropanesulfonic acid, vinylphosphonic acid, α-methylvinylphosphonic acid and allylphosphonic acid;
esters of α,β-ethylenically unsaturated mono- and dicarboxylic acids with $C_2$-$C_3$ alkanediols, for example 2-hydroxyethyl acrylate, 2-hydroxyethyl methacrylate, 2-hydroxyethyl ethacrylate, 2-hydroxypropyl acrylate, 2-hydroxypropyl methacrylate, 3-hydroxypropyl acrylate, 3-hydroxypropyl methacrylate and polyalkylene glycol (meth)acrylates;
α,β-ethylenically unsaturated monocarboxylic acid amides and their N-alkyl and N,N-dialkyl derivatives, such as acrylamide, methacrylamide, N-methyl(meth) acrylamide, N-ethyl(meth)acrylamide, N-isopropyl (meth)-acrylamide, N,N-dimethyl(meth)acrylamide, N,N-diethyl(meth)acrylamide, morpholinyl(meth)

acrylamide, and methylolacrylamide (acrylamide and N,N-dimethyl(meth)acrylamide prove to be in particular advantageous);

N-vinyllactams and its derivatives, for example N-vinylpyrrolidone or N-vinylpiperidone;

open-chain N-vinylamide compounds, for example N-vinylformamide, N-vinyl-N-methylformamide, N-vinylacetamide, N-vinyl-N-methylacetamide, N-vinyl-N-ethylacetamide, N-vinylpropionamide, N-vinyl-N-methylpropionamide and N-vinylbutyramide;

esters of α,β-ethylenically unsaturated mono- and dicarboxylic acids with aminoalcohols, for example N,N-dimethylaminomethyl (meth)acrylate, N,N-dimethylaminoethyl (meth)acrylate, N,N-diethylaminoethyl acrylate and N,N-dimethylaminopropyl (meth)acrylate;

amides of α,β-ethylenically unsaturated mono- and dicarboxylic acids with diamines comprising at least one primary or secondary amino group, such as N-[2-(dimethylamino)ethyl]acrylamide, N-[2-(dimethylamino)ethyl]-methacrylamide, N-[3-(dimethylamino)propyl]acrylamide, N-[3-(dimethylamino)-propyl]methacrylamide, N-[4-(dimethylamino)butyl]acrylamide and N-[4-(dimethylamino)butyl] methacrylamide;

N-diallylamines, N,N-diallyl-N-alkylamines, their acid addition salts and their quaternization products, the alkyl employed here preferably being $C_1$-$C_3$ alkyl;

N,N-diallyl-N-methylamine and N,N-diallyl-N,N-dimethylammonium compounds, for example the chlorides and bromides;

nitrogenous heterocycles substituted with vinyl and allyl, for example N-vinylimidazole, N-vinyl-2-methylimidazole, heteroaromatic compounds substituted with vinyl and allyl, for example 2- and 4-vinylpyridine, 2- and 4-allylpyridine, and their salts;

sulfobetaines; and the salts of the abovementioned monomers;

the mixtures and combinations of two or more of the monomers and/or their salts mentioned above.

According to a specific embodiment, these monomers can in particular comprise acrylic acid (AA).

According to another embodiment, the hydrophilic monomers of the chain (C) comprise (and typically consist of) (meth)acrylamide monomers, or more generally (meth)acrylamido monomers, including:

acrylamido monomers, namely acrylamide (Am), dimethylacrylamide (DMA), its sulfonate derivative, in particular acrylamidomethylpropanesulfonic acids (AMPS);

the quaternary ammonium APTAC and sulfopropyldimethylammoniopropylacrylamide;

methacrylamido monomers, such as sulfopropyldimethylammoniopropylmethacrylamide (SPP) or sulfohydroxypropyldimethylammoniopropylmethacrylamide.

According to a specific embodiment, the hydrophilic monomers of the chain (C) are acrylamides. An acrylamide is preferably an acrylamide which is not stabilized with copper.

According to a specific embodiment, the hydrophilic monomers of the chain (C) are chosen from acrylamides, dimethylacrylamides (DMA), acrylamidomethylpropanesulfonic acids (AMPS), acrylic acids (AA), their salts and their mixtures.

According to a specific embodiment, the hydrophilic monomers of the chain (C) can typically have a polymerizable functional group of acrylamido type and a side chain composed of ethylene oxide or propylene oxide strings, or else based on N-isopropylacrylamide or N-vinylcaprolactam.

Hydrophobic Monomers

Mention may in particular be made, as nonlimiting examples of hydrophobic monomers constituting the insoluble blocks which can be used according to the invention, of:

vinylaromatic monomers, such as styrene, α-methylstyrene, para-chloromethylstyrene, vinyltoluene, 2-methylstyrene, 4-methylstyrene, 2-(n-butyl)styrene, 4-(n-decyl)styrene or tert-butylstyrene;

halogenated vinyl compounds, such as vinyl or vinylidene halides, for example vinyl or vinylidene chlorides or fluorides, corresponding to the formula

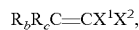

where: $X^1$=F or Cl
$X^2$=H, F or Cl
each one of $R_b$ and $R_c$, represents, independently:
H, Cl, F; or
an alkyl group, preferably chlorinated and/or fluorinated, more advantageously perchlorinated or perfluorinated;

esters of α,β-ethylenically unsaturated mono- or dicarboxylic acid with $C_2$-$C_{30}$ alkanols, for example methyl ethacrylate, ethyl (meth)acrylate, ethyl ethacrylate, n-propyl (meth)acrylate, isopropyl (meth)acrylate, n-butyl (meth)acrylate, sec-butyl (meth)acrylate, tert-butyl (meth)acrylate, tert-butyl ethacrylate, n-hexyl (meth)acrylate, n-heptyl (meth)acrylate, n-octyl (meth)acrylate, 1,1,3,3-tetramethylbutyl (meth)acrylate, ethylhexyl (meth)acrylate, n-nonyl (meth)acrylate, n-decyl (meth)acrylate, n-undecyl (meth)acrylate, tridecyl (meth)acrylate, myristyl (meth)acrylate, pentadecyl (meth)acrylate, palmityl (meth)acrylate, heptadecyl (meth)acrylate, nonadecyl (meth)acrylate, arachidyl (meth)acrylate, behenyl (meth)acrylate, lignoceryl (meth)acrylate, cerotinyl (meth)acrylate, melissinyl (meth)acrylate, palmitoleoyl (meth)acrylate, oleyl (meth)acrylate, linoleyl (meth)acrylate, linolenyl (meth)acrylate, stearyl (meth)acrylate, lauryl (meth)acrylate and their mixtures;

esters of vinyl or allyl alcohol with $C_1$-$C_{30}$ monocarboxylic acids, for example vinyl formate, vinyl acetate, vinyl propionate, vinyl butyrate, vinyl laurate, vinyl stearate, vinyl propionate, vinyl versatate and their mixtures;

ethylenically unsaturated nitriles, such as acrylonitrile, methacrylonitrile and their mixtures;

esters of α,β-ethylenically unsaturated mono- and dicarboxylic acids with $C_3$-$C_{30}$ alkanediols, for example 3-hydroxybutyl acrylate, 3-hydroxybutyl methacrylate, 4-hydroxybutyl acrylate, 4-hydroxybutyl methacrylate, 6-hydroxyhexyl acrylate, 6-hydroxyhexyl methacrylate, 3-hydroxy-2-ethylhexyl acrylate and 3-hydroxy-2-ethylhexyl methacrylate, and the like;

primary amides of α,β-ethylenically unsaturated mono- and dicarboxylic acids and N-alkyl and N,N-dialkyl derivatives, such as N-propyl(meth)acrylamide, N-(n-butyl)(meth)acrylamide, N-(tert-butyl)(meth)acrylamide, N-(n-octyl)(meth)-acrylamide, N-(1,1,3,3-tetramethylbutyl)(meth)acrylamide, N-ethylhexyl (meth)-acrylamide, N-(n-nonyl)(meth)acrylamide, N-(n-decyl)(meth)acrylamide, N-(n-undecyl)(meth)

acrylamide, N-tridecyl(meth)acrylamide, N-myristyl (meth)-acrylamide, N-pentadecyl(meth)acrylamide, N-palmityl(meth)acrylamide, N-heptadecyl(meth) acrylamide, N-nonadecyl(meth)acrylamide, N-arachidyl-(meth)acrylamide, N-behenyl(meth) acrylamide, N-lignoceryl(meth)acrylamide, N-cerotinyl(meth)acrylamide, N-melissinyl(meth) acrylamide, N-palmitoleoyl-(meth)acrylamide, N-oleyl(meth)acrylamide, N-linoleyl(meth)acrylamide, N-linolenyl(meth)acrylamide, N-stearyl(meth) acrylamide and N-lauryl(meth)-acrylamide;

N-vinyllactams and its derivatives, such as N-vinyl-5-ethyl-2-pyrrolidone, N-vinyl-6-methyl-2-piperidone, N-vinyl-6-ethyl-2-piperidone, N-vinyl-7-methyl-2-caprolactam and N-vinyl-7-ethyl-2-caprolactam, and the like;

esters of α,β-ethylenically unsaturated mono- and dicarboxylic acids with aminoalcohols, for example N,N-dimethylaminocyclohexyl (meth)acrylate;

amides of α,β-ethylenically unsaturated mono- and dicarboxylic acids with diamines comprising at least one primary or secondary amino group, for example N-[4-(dimethylamino)butyl]acrylamide, N-[4-(dimethylamino)butyl]-methacrylamide, N-[2-(dimethylamino)ethyl]acrylamide, N-[4-(dimethyl-amino)cyclohexyl]acrylamide, N-[4-(dimethylamino) cyclohexyl]methacrylamide, and the like; and monoolefins ($C_2$-$C_8$) and nonaromatic hydrocarbons comprising at least two conjugated double bonds, for example ethylene, propylene, isobutylene, isoprene, butadiene, and the like.

According to a preferred embodiment, the hydrophobic monomers employed according to the invention can be chosen from:

$C_1$-$C_{30}$ alkyl and preferably $C_4$-$C_{22}$ alkyl α,β-unsaturated esters, in particular alkyl acrylates and methacrylates, such as methyl, ethyl, butyl, 2-ethylhexyl, isooctyl, lauryl, isodecyl or stearyl acrylates and methacrylates (lauryl methacrylate in particular proves to be especially advantageous);

$C_1$-$C_{30}$ alkyl and preferably $C_4$-$C_{22}$ alkyl α,β-unsaturated amides, in particular alkylacrylamides and alkylmethacrylamides, such as methyl-, ethyl-, butyl-, 2-ethylhexyl-, isooctyl-, lauryl-, isodecyl- or stearylacrylamide or -methacrylamide (laurylmethacrylamide in particular proves to be especially advantageous);

vinyl or allyl alcohol esters of saturated carboxylic acids, such as vinyl or allyl acetate, propionate, versatate or stearate;

α,β-unsaturated nitriles comprising from 3 to 12 carbon atoms, such as acrylonitrile or methacrylonitrile;

α-olefins and conjugated dienes;

vinylaromatic monomers, such as styrene, α-methylstyrene, para-chloromethylstyrene, vinyltoluene, 2-methylstyrene, 4-methylstyrene, 2-(n-butyl)styrene, 4-(n-decyl)styrene or tert-butylstyrene;

the mixtures and combinations of two or more of the abovementioned monomers.

According to an advantageous embodiment, in particular when the fluid (F) is a fracturing fluid, use may be made of hydrophobic monomers which bond feebly to the chain (C). This makes it possible, if necessary, to remove the polymers introduced within the subterranean formation (in view of their amphiphilic nature, the polymers of the invention generally have a self-associative nature and tend to form gels which are difficult to remove; under the effect in particular of the temperature and/or the pH, it is possible to cleave the hydrophobic monomers if they are not bonded excessively strongly to the polymer, which makes possible removal from the fluid). Hydrophobic monomers suited to this embodiment are in particular the abovementioned esters.

It should be noted that, when other monomers are used, removal from the fluids is still possible by a technique known per se, where "breakers", such as oxidizing agents, are added. The preceding embodiment makes it possible to dispense with the use of such "breakers", which is reflected in particular in terms of decrease in cost.

According to a specific embodiment, the synthesized polymers of the invention can exhibit a molecular weight of greater than 600 000 g/mol, preferably of greater than 1 000 000 g/mol, indeed even ranging up to 2 000 000.

According to a specific embodiment, the polymers can exhibit a molecular weight of greater than or equal to 2 000 000 g/mol, for example between 2 000 000 and 3 000 000 g/mol, indeed even ranging up to 4 000 000 g/mol.

The Radical Polymerization Control Agent

The control agent employed in stage (E) or, if appropriate, in stage ($E^0$) of the process of the invention is advantageously a compound carrying a thiocarbonylthio —S(C=S)— group. According to a specific embodiment, the control agent can carry several thiocarbonylthio groups. It can optionally be a polymer chain carrying such a group.

Thus, this control agent can, for example, correspond to the formula (A) below:

(A)

in which:
Z represents:
a hydrogen atom,
a chlorine atom,
an optionally substituted alkyl or optionally substituted aryl radical,
an optionally substituted heterocycle,
an optionally substituted alkylthio radical,
an optionally substituted arylthio radical,
an optionally substituted alkoxy radical,
an optionally substituted aryloxy radical,
an optionally substituted amino radical,
an optionally substituted hydrazine radical,
an optionally substituted alkoxycarbonyl radical,
an optionally substituted aryloxycarbonyl radical,
an optionally substituted acyloxy or carboxyl radical,
an optionally substituted aroyloxy radical,
an optionally substituted carbamoyl radical,
a cyano radical,
a dialkyl- or diarylphosphonato radical,
a dialkyl-phosphinato or diaryl-phosphinato radical, or
a polymer chain, and
$R_1$ represents:
an optionally substituted alkyl, acyl, aryl, aralkyl, alkenyl or alkynyl group,
a saturated or unsaturated, aromatic, optionally substituted carbocycle or heterocycle, or
a polymer chain, which is preferably hydrophilic or water-dispersible when the agent is employed in stage (E).

The R₁ or Z groups, when they are substituted, can be substituted by optionally substituted phenyl groups, optionally substituted aromatic groups, saturated or unsaturated carbocycles, saturated or unsaturated heterocycles, or groups selected from the following: alkoxycarbonyl or aryloxycarbonyl (—COOR), carboxyl (—COOH), acyloxy (—O₂CR), carbamoyl (—CONR₂), cyano (—CN), alkylcarbonyl, alkylarylcarbonyl, arylcarbonyl, arylalkylcarbonyl, phthalimido, maleimido, succinimido, amidino, guanidimo, hydroxyl (—OH), amino (—NR₂), halogen, perfluoroalkyl $C_nF_{2n+1}$, allyl, epoxy, alkoxy (—OR), S-alkyl, S-aryl, groups exhibiting a hydrophilic or ionic nature, such as alkali metal salts of carboxylic acids, alkali metal salts of sulfonic acids, polyalkylene oxide (PEO, PPO) chains, cationic substituents (quaternary ammonium salts), R representing an alkyl or aryl group, or a polymer chain.

For the control agents of formula (A) employed in stage (E), it is generally preferred for the R₁ group to be of hydrophilic nature. Advantageously, it is a water-soluble or water-dispersible polymer chain.

The R₁ group can alternatively be amphiphilic, namely exhibit both a hydrophilic and a lipophilic nature. It is preferable for R₁ not to be hydrophobic.

As regards the control agents of formula (A) employed in stage (E⁰), R₁ can typically be a substituted or unsubstituted, preferably substituted, alkyl group. A control agent of formula (A) employed in stage (E⁰) can nevertheless comprise other types of R₁ groups, in particular a ring or a polymer chain.

The optionally substituted alkyl, acyl, aryl, aralkyl or alkynyl groups generally exhibit from 1 to 20 carbon atoms, preferably from 1 to 12 and more preferably from 1 to 9 carbon atoms. They can be linear or branched. They can also be substituted by oxygen atoms, in particular in the form of esters, sulfur atoms or nitrogen atoms.

Mention may in particular be made, among the alkyl radicals, of the methyl, ethyl, propyl, butyl, pentyl, isopropyl, tert-butyl, pentyl, hexyl, octyl, decyl or dodecyl radical.

The alkyne groups are radicals generally of 2 to 10 carbon atoms; they exhibit at least one acetylenic unsaturation, such as the acetylenyl radical.

The acyl group is a radical generally exhibiting from 1 to 20 carbon atoms with a carbonyl group.

Mention may in particular be made, among the aryl radicals, of the phenyl radical, which is optionally substituted, in particular by a nitro or hydroxyl functional group.

Mention may in particular be made, among the aralkyl radicals, of the benzyl or phenethyl radical, which is optionally substituted, in particular by a nitro or hydroxyl functional group.

When R₁ or Z is a polymer chain, this polymer chain can result from a radical or ionic polymerization or from a polycondensation.

Advantageously, use is made, as control agent for stage (E) and also for stage (E⁰), if appropriate, of compounds carrying a xanthate —S(C=S)O—, trithiocarbonate, dithiocarbamate or dithiocarbazate functional group, for example carrying an O-ethyl xanthate functional group of formula —S(C=S)OCH₂CH₃.

When stage (E⁰) is carried out, it is in particular advantageous to employ, as control agents in this stage, a compound chosen from xanthates, trithiocarbonates, dithiocarbamates and dithiocarbazates. Xanthates prove to be very particularly advantageous, in particular those carrying an O-ethyl xanthate —S(C=S)OCH₂CH₃ functional group, such as O-ethyl S-(1-(methoxycarbonyl)ethyl) xanthate (CH₃CH(CO₂CH₃))S(C=S)OEt. Another possible control agent in stage (E⁰) is dibenzyl trithiocarbonate of formula PhCH₂S(C=S)SCH₂Ph (where Ph=phenyl).

The living prepolymers obtained in step (E⁰) by using the abovementioned control agents prove to be particularly advantageous for carrying out stage (E).

Initiation and Implementation of the Radical Polymerizations of Stages (E) and (E⁰)

When it is employed in stage (E), the radical polymerization initiator is preferably water-soluble or water-dispersible. Apart from this preferential condition, any radical polymerization initiator (source of free radicals) known per se and suited to the conditions chosen for these stages can be employed in stage (E) and stage (E⁰) of the process of the invention.

Thus, the radical polymerization initiator employed according to the invention can, for example, be chosen from the initiators conventionally used in radical polymerization. It can, for example, be one of the following initiators:

hydrogen peroxides, such as: tert-butyl hydroperoxide, cumene hydroperoxide, t-butyl peroxyacetate, t-butyl peroxybenzoate, t-butyl peroxyoctoate, t-butyl peroxyneodecanoate, t-butyl peroxyisobutyrate, lauroyl peroxide, t-amyl peroxypivalate, t-butyl peroxypivalate, dicumyl peroxide, benzoyl peroxide, potassium persulfate or ammonium persulfate, azo compounds, such as: 2,2'-azobis(isobutyronitrile), 2,2'-azobis(2-butanenitrile), 4,4'-azobis(4-pentanoic acid), 1,1'-azobis(cyclohexanecarbonitrile), 2-(t-butylazo)-2-cyanopropane, 2,2'-azobis[2-methyl-N-(1,1)-bis(hydroxymethyl)-2-hydroxyethyl]-propionamide, 2,2'-azobis(2-methyl-N-hydroxyethyl]propionamide, 2,2'-azobis(N,N'-dimethyleneisobutyramidine)dichloride, 2,2'-azobis(2-amidinopropane)dichloride, 2,2'-azobis(N,N'-dimethyleneisobutyramide), 2,2'-azobis (2-methyl-N-[1,1-bis(hydroxy-methyl)-2-hydroxyethyl]propionamide), 2,2'-azobis(2-methyl-N-[1,1-bis(hydroxy-methyl)ethyl]propionamide), 2,2'-azobis[2-methyl-N-(2-hydroxyethyl)propionamide] or 2,2'-azobis(isobutyramide)dihydrate, redox systems comprising combinations, such as:

mixtures of hydrogen peroxide, alkyl peroxide, peresters, percarbonates and the like and any iron salt, titanous salt, zinc formaldehyde sulfoxylate or sodium formaldehyde sulfoxylate, and reducing sugars, alkali metal or ammonium persulfates, perborates or perchlorates in combination with an alkali metal bisulfite, such as sodium metabisulfite, and reducing sugars, and alkali metal persulfates in combination with an arylphosphinic acid, such as benzenephosphonic acid and the like, and reducing sugars.

Typically, the amount of initiator to be used is preferably determined so that the amount of radicals generated is at most 50 mol % and preferably at most 20 mol %, with respect to the amount of control or transfer agent.

Very particularly in stage (E), it generally proves to be advantageous to use a radical initiator of redox type, which exhibits, inter alia, the advantage of not requiring heating of the reaction medium (no thermal initiation), and the inventors of which have in addition now discovered that it proves to be suitable for the micellar polymerization of stage (E).

Thus, the radical polymerization initiator employed in stage (E) can typically be a redox initiator, typically not requiring heating for its thermal initiation. It is typically a mixture of at least one oxidizing agent with at least one reducing agent.

The oxidizing agent present in this redox system is preferably a water-soluble agent. This oxidizing agent can, for example, be chosen from peroxides, such as: hydrogen peroxide, tert-butyl hydroperoxide, cumene hydroperoxide, t-butyl peroxyacetate, t-butyl peroxybenzoate, t-butyl peroxyoctoate, t-butyl peroxyneodecanoate, t-butyl peroxyisobutyrate, lauroyl peroxide, t-amyl peroxypivalate, t-butyl peroxypivalate, dicumyl peroxide, benzoyl peroxide, sodium persulfate, potassium persulfate, ammonium persulfate or also potassium bromate.

The reducing agent present in the redox system is also preferably a water-soluble agent. This reducing agent can typically be chosen from sodium formaldehyde sulfoxylate (in particular in its dihydrate form, known under the name Rongalit, or in the form of an anhydride), ascorbic acid, erythorbic acid, sulfites, bisulfites or metasulfites (in particular alkali metal sulfites, bisulfites or metasulfites), nitrilotrispropionamides, and tertiary amines and ethanolamines (which are preferably water-soluble).

Possible redox systems comprise combinations, such as:
mixtures of water-soluble persulfates with water-soluble tertiary amines,
mixtures of water-soluble bromates (for example, alkali metal bromates) with water-soluble sulfites (for example, alkali metal sulfites),
mixtures of hydrogen peroxide, alkyl peroxide, peresters, percarbonates and the like and any iron salt, titanous salt, zinc formaldehyde sulfoxylate or sodium formaldehyde sulfoxylate, and reducing sugars,
alkali metal or ammonium persulfates, perborates or perchlorates in combination with an alkali metal bisulfite, such as sodium metabisulfite, and reducing sugars, and
alkali metal persulfates in combination with an arylphosphinic acid, such as benzenephosphonic acid and the like, and reducing sugars.

An advantageous redox system comprises (and preferably consists of) the combination of ammonium persulfate and sodium formaldehyde sulfoxylate.

Generally, and in particular in the case of the use of a redox system of the ammonium persulfate/sodium formaldehyde sulfoxylate type, it proves to be preferable for the reaction medium of stage (E) to be devoid of copper. In the case of the presence of copper, it is generally desirable to add a copper-complexing agent, such as EDTA, in an amount capable of masking its presence.

Whatever the nature of the initiator employed, the radical polymerization of stage) ($E^0$) can be carried out in any appropriate physical form, for example in solution in water or in a solvent, for example an alcohol or THF, in emulsion in water ("latex" process) or in bulk, if appropriate while controlling the temperature and/or the pH in order to render entities liquid and/or soluble or insoluble.

After carrying out stage (E), given the specific use of a control agent, polymers functionalized with transfer groups (living polymers) are obtained. This living character makes it possible, if desired, to employ these polymers in a subsequent polymerization reaction, according to a technique well known per se. Alternatively, if required, it is possible to deactivate or to destroy the transfer groups, for example by hydrolysis, ozonolysis or reaction with amines, according to means known per se. Thus, according to a specific embodiment, the process of the invention can comprise, after stage (E), a stage (E1) of hydrolysis, of ozonolysis or of reaction with amines which is capable of deactivating and/or destroying all or a portion of the transfer groups present on the polymer prepared in stage (E).

Surfactants

Use may be made, in order to prepare the micellar solution of the hydrophobic monomers which are employed in stage (E), of any suitable surfactant in a nonlimiting manner; use may be made, for example, of the surfactants chosen from the following list:

The anionic surfactants can be chosen from:
alkyl ester sulfonates, for example of formula R—CH($SO_3M$)-$CH_2COOR'$, or alkyl ester sulfates, for example of formula R—CH($OSO_3M$)-$CH_2COOR'$, where R represents a $C_8$-$C_{20}$ and preferably $C_{10}$-$C_{16}$ alkyl radical, R' represents a $C_1$-$C_6$ and preferably $C_1$-$C_3$ alkyl radical and M represents an alkali metal cation, for example the sodium cation, or the ammonium cation. Mention may very particularly be made of methyl ester sulfonates, the R radical of which is a $C_{14}$-$C_{16}$ radical;
alkylbenzenesulfonates, more particularly $C_9$-$C_{20}$ alkylbenzenesulfonates, primary or secondary alkylsulfonates, in particular $C_8$-$C_{22}$ alkylsulfonates, or alkylglycerolsulfonates;
alkyl sulfates, for example of formula $ROSO_3M$, where R represents a $C_{10}$-$C_{24}$ and preferably $C_{12}$-$C_{20}$ alkyl or hydroxyalkyl radical and M represents a cation with the same definition as above;
alkyl ether sulfates, for example of formula RO(OA)$_n$$SO_3M$, where R represents a $C_{10}$-$C_{24}$ and preferably $C_{12}$-$C_{20}$ alkyl or hydroxyalkyl radical, OA represents an ethoxylated and/or propoxylated group, M represents a cation with the same definition as above and n generally varies from 1 to 4, such as, for example, lauryl ether sulfate with n=2;
alkylamide sulfates, for example of formula $RCONHR'OSO_3M$, where R represents a $C_2$-$C_{22}$ and preferably $C_6$-$C_{20}$ alkyl radical, R' represents a $C_2$-$C_3$ alkyl radical and M represents a cation with the same definition as above, and also their polyalkoxylated (ethoxylated and/or propoxylated) derivatives (alkylamide ether sulfates);
salts of saturated or unsaturated fatty acids, for example such as $C_5$-$C_{24}$ and preferably $C_{14}$-$C_{20}$ acids, and of an alkaline earth metal cation, N-acyl-N-alkyltaurates, alkylisethionates, alkylsuccinamates and alkyl sulfosuccinates, alkylglutamates, monoesters or diesters of sulfosuccinates, N-acylsarcosinates or polyethoxycarboxylates;
monoester and diester phosphates, for example having the following formula: $(RO)_x$—P($=$O)$(OM)_{x'}$, where R represents an optionally polyalkoxylated alkyl, alkylaryl, arylalkyl or aryl radical, x and x' are equal to 1 or 2, provided that the sum of x and x' is equal to 3, and M represents an alkaline earth metal cation;

The nonionic surfactants can be chosen from:
alkoxylated fatty alcohols, for example laureth-2, laureth-4, laureth-7 or oleth-20, alkoxylated triglycerides, alkoxylated fatty acids, alkoxylated sorbitan esters, alkoxylated fatty amines, alkoxylated di(1-phenylethyl)phenols, alkoxylated tri(1-phenylethyl)phenols, alkoxylated alkylphenols, the products resulting from the condensation of ethylene oxide with a hydrophobic compound resulting from the condensation of propylene oxide with propylene glycol, such as the Pluronic products sold by BASF, the products resulting from the condensation of ethylene oxide the compound resulting from the condensation of propylene oxide with ethylenediamine, such as the Tetronic products sold by BASF, alkylpolyglycosides, such as those described in U.S. Pat. No. 4,565,647, or alkylglucosides, or fatty acid amides, for example $C_5$-$C_{20}$ fatty acid amides, in particular fatty acid monoalkanolamides, for example cocamide MEA or cocamide MIPA;

The amphoteric surfactants (true amphoteric entities comprising an ionic group and a potentially ionic group of opposite charge, or zwitterionic entities simultaneously comprising two opposite charges) can be:

betaines generally, in particular carboxybetaines, for example lauryl betaine (Mirataine BB from Rhodia) or octyl betaine or coco betaine (Mirataine BB-FLA from Rhodia); amidoalkyl betaines, such as cocamidopropyl betaine (CAPB) (Mirataine BDJ from Rhodia or Mirataine BET C-30 from Rhodia);

sulfobetaines or sultaines, such as cocamidopropyl hydroxysultaine (Mirataine CBS from Rhodia);

alkylamphoacetates and alkylamphodiacetates, such as, for example, comprising a cocoyl or lauryl chain (Miranol C2M Conc. NP, C32, L32 in particular, from Rhodia);

alkylamphopropionates or alkylamphodipropionates (Miranol C2M SF);

alkyl amphohydroxypropyl sultaines (Miranol CS);

alkylamine oxides, for example lauramine oxide (INCI);

The cationic surfactants can be optionally polyethoxylated primary, secondary or tertiary fatty amine salts, quaternary ammonium salts, such as tetraalkylammonium, alkylamidoalkylammonium, trialkylbenzylammonium, trialkylhydroxyalkylammonium or alkylpyridinium chlorides or bromides, imidazoline derivatives or amine oxides having a cationic nature. An example of a cationic surfactant is cetrimonium chloride or bromide (INCI);

the surfactants employed according to the present invention can be block copolymers comprising at least one hydrophilic block and at least one hydrophobic block different from the hydrophilic block, which are advantageously obtained according to a polymerization process where:

(a$_0$) at least one hydrophilic (respectively hydrophobic) monomer, at least one source of free radicals and at least one radical polymerization control agent of the —S(C=S)— type are brought together within an aqueous phase;

(a$_1$) the polymer obtained on conclusion of stage (a$_0$) is brought into contact with at least one hydrophobic (respectively hydrophilic) monomer different from the monomer employed in stage (a$_0$) and at least one source of free radicals; via which a diblock copolymer is obtained.

Polymers of the triblock type, or comprising more blocks, can optionally be obtained by carrying out, after stage (a$_1$), a stage (a$_2$) in which the polymer obtained on conclusion of stage (a$_1$) is brought into contact with at least one monomer different from the monomer employed in stage (a$_1$) and at least one source of free radicals; and more generally by carrying out (n+1) stages of the type of the abovementioned stages (a$_1$) and (a$_2$) and n is an integer typically ranging from 1 to 3, where, in each stage (a$_n$), with the polymer obtained on conclusion of stage (a$_{n-1}$) is brought into contact with at least one monomer different from the monomer employed in stage (a$_{n-1}$) and at least one source of free radicals. Use may be made, for example, according to the invention, of the copolymers of the type which are described in WO03068827, WO03068848 and WO2005/021612.

Practical Applications

The polymers of use according to the invention can be employed in virtually all of the fluids used in oil extraction and potentially subject to the loss of fluid.

According to one embodiment, the fluid (F) comprises solid particles (p) and/or is brought into contact with solid particles (p) within the subterranean formation subsequent to its injection.

According to another embodiment, the fluid (F) injected under pressure into a subterranean formation does not comprise solid particles (p).

According to a specific embodiment of the invention, the fluid (F) is an oil cement grout which comprises the polymer (P) as additive. In this case, the polymer (P), in combination with the particles present in the cement, provides the effect of control of fluid loss during the cementing.

According to another embodiment, the fluid (F) is a drilling fluid or a fracturing fluid which comprises the polymer (P) in combination with particles (p). The particles (p) are then generally introduced jointly with the polymer into the fluid (F) before the injection of the fluid. The polymer then generally provides stabilization of the dispersion of the particles in the fluid (F) by keeping at least a portion of the particles (p) in suspension in the fluid.

The concentrations of polymer and particles to be employed in these various fluids can be adjusted individually as a function of the application targeted and of the rheology desired.

Various aspects and advantages of the invention will be further illustrated by the examples below. Examples B to D illustrate the invention.

EXAMPLES

Example A Poly(Dimethylacrylamide/AMPS) 60/40 Mol % Mw=2000 kg/mol (SEC-MALS Characterization) (Comparative Example)

7.37 g of mercaptoacetic acid (1% by weight aqueous solution), 39.34 g of dimethylacrylamide (DMAm), 121.30 g of 2-acrylamido-2-methylpropanesulfonic acid sodium salt (AMPS) (50% by weight aqueous solution) and 820.57 g of demineralized water were weighed into a 1000 ml flask. The solution was stirred for 2 min using a magnetic bar and then the pH was adjusted to 7.6 using a 20% sodium hydroxide solution.

This solution was charged to a 2 l glass reactor equipped with an anchor stirrer, with a nitrogen inlet, with a temperature probe and with a reflux condenser. Degassing by bubbling was carried out for 1 h and the solution was heated to 62° C. When the temperature was stable, 3.2 g of tetraethylenepentamine (TEPA) (10% by weight aqueous solution) were added. After 2 min, 8.21 g of sodium formaldehyde sulfoxylate (NaFS) (30% by weight aqueous solution) were added. Stirring was allowed to take place for 1 h and then the reactor was emptied.

Example B Poly(Dimethylacrylamide/AMPS/tBS) 59.55/39.7/0.75 Mol % n$_H$ 20 Mnth 2 000 000 g/mol Stage 1. Preparation of a Micellar Solution of 4-Tert-Butylstyrene (tBS) with Sodium Dodecyl Sulfate (SDS)—SOLUTION A 27 g of SDS and 103.16 g of distilled water were introduced at ambient temperature (20° C.) into a 250 ml flask. Stirring was carried out on a water bath (35° C.) for 1 h using a magnetic bar, until a clear micellar solution was obtained. 4.84 g of tBS were then added. The mixture was stirred on the water bath (35° C.) for 1 h, until a clear micellar solution was obtained.

Stage 2. Micellar Polymerization 210.8 g of dimethylacrylamide, 649.9 g of 2-acrylamido-2-methylpropanesulfonic acid sodium salt (AMPS) (50% by weight aqueous solution), 788 g of distilled water, 118.7 g of solution A and 5.572 g of O-ethyl S-(1-(methoxycarbonyl)ethyl) xanthate of formula $(CH_3CH(CO_2CH_3))S(C=S)OEt$ (1% by weight solution in ethanol) were introduced, at ambient temperature (20° C.), into a 2500 ml flask. The pH of the mixture was subsequently adjusted to 6 using a sulfuric acid solution (10% by weight aqueous solution).

The mixture was introduced into a 3 l Dewar flask equipped with a lid, with an anchor stirrer, with a temperature probe and with a nitrogen inlet. The solution was degassed by bubbling with nitrogen for 1 h. 18 g of sodium formaldehyde sulfoxylate (NaFS), in the form of a 1% by weight aqueous solution, were added to the medium all at once. After 5 minutes, 9 g of potassium sulfate (KPS), in the form of a 5% aqueous solution, were added all at once. This KPS solution was degassed beforehand by bubbling with nitrogen for 30 minutes.

The polymerization reaction was then allowed to take place, with stirring, at up to 40° C., for 24 h. The mixture in the Dewar flask, returned to 25° C., was discharged.

Example C
Poly(dimethylacrylamide/acrylamide/AMPS/tBS)
39.7/39.7/19.85/0.75 mol % $n_H$ 20 Mnth 2 000 000 g/mol Stage 1. Preparation of a Micellar Solution of 4-Tert-Butylstyrene (tBS) with Sodium Dodecyl Sulfate (SDS)—SOLUTION A 40 g of SDS and 152.82 g of distilled water were introduced at ambient temperature (20° C.) into a 250 ml flask. Stirring was carried out on a water bath (35° C.) for 1 h using a magnetic bar, until a clear micellar solution was obtained. 7.18 g of tBS were then added. The mixture was stirred on the water bath (35° C.) for 1 h, until a clear micellar solution was obtained.

Stage 2. Micellar Polymerization 266.7 g of acrylamide (50% by weight aqueous solution), 430.1 g of 2-acrylamido-2-methylpropanesulfonic acid sodium salt (AMPS) (50% by weight aqueous solution), 186 g of dimethylacrylamide, 726.5 g of distilled water, 157.1 g of solution A and 5.557 g of O-ethyl S-(1-(methoxycarbonyl)ethyl) xanthate of formula $(CH_3CH(CO_2CH_3))S(C=S)OEt$ (1% by weight solution in ethanol) were introduced, at ambient temperature (20° C.), into a 2500 ml flask. The pH of the mixture was subsequently adjusted to 6 using a sulfuric acid solution (10% by weight aqueous solution).

The mixture was introduced into a 3 l Dewar flask equipped with a lid, with an anchor stirrer, with a temperature probe and with a nitrogen inlet. The solution was degassed by bubbling with nitrogen for 1 h. 18 g of sodium formaldehyde sulfoxylate (NaFS), in the form of a 1% by weight aqueous solution, were added to the medium all at once. After 5 minutes, 9 g of potassium sulfate (KPS), in the form of a 5% aqueous solution, were added all at once. This KPS solution was degassed beforehand by bubbling with nitrogen for 30 minutes.

The polymerization reaction was then allowed to take place, with stirring, at up to 40° C., for 24 h. The mixture in the Dewar flask, returned to 25° C., was discharged.

Example D Poly(acrylamide/AMPS/LMAm)
79.4/19.8/0.8 mol % $n_H$ 12 Mnth 2 000 000 g/mol Stage 1. Preparation of a Micellar Solution of Laurylmethacrylamide (LMAm) with Sodium Dodecyl Sulfate (SDS)—SOLUTION A 66 g of SDS and 222.76 g of distilled water were introduced at ambient temperature (20° C.) into a 500 ml flask. Stirring was carried out on a water bath (35° C.) for 1 h using a magnetic bar, until a clear micellar solution was obtained. 11.24 g of LMAm were then added. The mixture was stirred on the water bath (35° C.) for 2 h, until a clear micellar solution was obtained.

Stage 2. Micellar Polymerization 586.4 g of acrylamide (50% by weight aqueous solution), 472.7 g of 2-acrylamido-2-methylpropanesulfonic acid sodium salt (AMPS) (50% by weight aqueous solution), 429.9 g of distilled water, 279.1 g of solution A and 5.507 g of O-ethyl S-(1-(methoxycarbonyl)ethyl) xanthate of formula $(CH_3CH(CO_2CH_3))S(C=S)OEt$ (1% by weight solution in ethanol) were introduced, at ambient temperature (20° C.), into a 2500 ml flask. The pH of the mixture was subsequently adjusted to 6 using a sulfuric acid solution (10% by weight aqueous solution).

The mixture was introduced into a 3 l Dewar flask equipped with a lid, with an anchor stirrer, with a temperature probe and with a nitrogen inlet. The solution was degassed by bubbling with nitrogen for 1 h. 17.5 g of sodium formaldehyde sulfoxylate (NaFS), in the form of a 1% by weight aqueous solution, were added to the medium all at once. After 5 minutes, 8.89 g of potassium sulfate (KPS), in the form of a 5% aqueous solution, were added all at once. This KPS solution was degassed beforehand by bubbling with nitrogen for 30 minutes.

The polymerization reaction was then allowed to take place, with stirring, at up to 40° C., for 24 h. The mixture in the Dewar flask, returned to 25° C., was discharged.

Evaluation of the Associative Polymers in Cement Grouts

The non-associative control polymer described in example A and also the associative polymers resulting from examples B and C are used to prepare low-density 11.5 ppg (1 ppg=0.1205 kg/l) oil cement grouts having the following formulation:

Municipal water: 477 g
Polymer as gel (comprising 30% of active principle): 5.3 g
Organic antifoaming agent: 1 g
Dykheroff black label cement (API Class G): 321.5 g The fluid loss control agent is mixed with the liquid additives and with the municipal water before incorporation of the cement.

The formulation and the filtration test were carried out according to the standard of the American Petroleum Institute (API recommended practice for testing well cements, 10B, 2nd edition, April 2013).

After mixing and dispersing all the constituents of the formulation, the grout obtained was conditioned at 88° C. for 20 minutes in an atmospheric consistometer (model 1250 supplied by Chandler Engineering Inc.), prestabilized at this temperature, which makes it possible to simulate the conditions experienced by the cement grout during descent in a well.

The rheology of the cement grouts is subsequently evaluated using a Chandler rotary viscometer (Chan 35 model) at the conditioning temperature of the cement slag. The viscosity is measured as a function of the shear gradient and the rheological profile of the cement slag is interpreted by regarding it as being a Bingham fluid. The characteristic quantities extracted are thus the plastic viscosity (PV, expressed in mPa·s) and the yield point (yield stress, expressed in lb/100 ft$^2$). The fluid loss control performance was determined by a static filtration at 88° C. in a double-ended cell with a capacity of 175 ml equipped with 325 mesh×60 mesh metal screens (supplied by Ofite Inc., reference 170-45). The performances of the polymers in the cement formulations are given in table 4 below:

TABLE 4

| Reference | FL API vol (ml) | PV (mPa · s) |
|---|---|---|
| A | 260 (calculated) | 6 |
| B | 120 | 22 |
| C | 110 | 24 |
| D | 88 | 21 |

The fluid loss volume is calculated when the test cannot be carried out for 30 min and when passage of the nitrogen (percolation through the filtration cell) is observed. In this instance, the comparative example A cannot provide correct control of fluid loss and the nitrogen percolates at t=20 min. In the case of the polymers B, C and D according to the invention, the nitrogen does not percolate during the 30 min of the test and the fluid loss volume remains low, at around 100 ml.

Evaluation of the Associative Polymers as Fracturing Fluid or Reservoir Drilling (Drill-In) Fluid The polymer of example D is dispersed at 0.5% by weight in a 2% KCl solution. The fluid, once homogenized, is filtered against a ceramic filter with a permeability of 400 mD (supplied by Ofite, model 170-55). The filtration is carried out for 30 min under a pressure of 35 bar at a temperature of 88° C.

The amount of fluid collected after 30 min is 30 ml. In the absence of filtration control, a volume of the order of 100 ml is expected in less than 1 min.

The invention claimed is:

1. A process for controlling fluid loss in a fluid (F) injected under pressure into a subterranean formation, the process comprising forming fluid (F) with solid particles (p) in suspension and amphiphilic sequential copolymers (P) comprising:
    at least one chain (C) soluble in the fluid (F) comprising hydrophilic and hydrophobic units, wherein the chain (C) is obtained by micellar polymerization; and
    at least one block (B) insoluble in the fluid (F); and
    injecting the fluid (F) under pressure into the subterranean formation, thereby controlling fluid loss in the fluid (F) where the fluid (F) which comprises the copolymers (P) as additive also comprises cement particles as the solid particles (p).

2. The process according to claim 1, wherein chain (C) is obtained by a process comprising a stage (e) of micellar radical polymerization in which the following are brought into contact, within an aqueous medium (M):
    hydrophilic monomers, dissolved or dispersed in said aqueous medium (M);
    hydrophobic monomers in the form of a micellar solution, namely a solution containing, in the dispersed state within said aqueous medium (M), micelles comprising these hydrophobic monomers; and
    at least one radical polymerization initiator.

3. The process according to claim 1, wherein chain (C) is obtained by a process comprising a stage (E) of micellar radical polymerization in which the following are brought into contact, within an aqueous medium (M):
    hydrophilic monomers, dissolved or dispersed in said aqueous medium (M);
    hydrophobic monomers in the form of a micellar solution, namely a solution containing, in the dispersed state within said aqueous medium (M), micelles comprising these hydrophobic monomers;
    at least one radical polymerization initiator; and
    at least one radical polymerization control agent.

4. The process according to claim 3, wherein the radical polymerization control agent is a compound which comprises a thiocarbonylthio—S(C=S)—group.

5. The process according to claim 1, wherein the fluid (F) is an aqueous fluid.

6. The process according to claim 2, wherein said aqueous medium (M) is water or a water/alcohol mixture.

7. The process according to claim 2, wherein the dispersed state is obtained using at least one surfactant.

8. The process according to claim 2, wherein the at least one radical polymerization initiator is water-soluble or water-dispersible.

9. The process according to claim 3, wherein said aqueous medium (M) is water or a water/alcohol mixture.

10. The process according to claim 3, wherein the dispersed state is obtained using at least one surfactant.

11. The process according to claim 3, wherein the at least one radical polymerization initiator is water-soluble or water-dispersible.

12. The process according to claim 4, wherein the radical polymerization control agent is a xanthate.

* * * * *